Nov. 8, 1932.    G. NICKEL    1,887,481

SANITARY CONTAINER

Filed July 1, 1931

INVENTOR:
GOTTFRIED NICKEL,
By Otto H. Kinger,
his Atty.

Patented Nov. 8, 1932

1,887,481

UNITED STATES PATENT OFFICE

GOTTFRIED NICKEL, OF LONG BEACH, CALIFORNIA, ASSIGNOR OF ONE-HALF TO SIEGFRIED J. DIETZMANN, OF LOS ANGELES, CALIFORNIA

SANITARY CONTAINER

Application filed July 1, 1931. Serial No. 548,109.

This invention relates to devices used for holding food objects such as small cookies or so-called soda-crackers or the like served with the meals and particularly with the soup in restaurants or any other eating places.

One of the objects of this invention is to provide a device by which soda-crackers and the like can be held and maintained in a sanitary condition and still can readily be grasped one by one.

Another object is to provide a device that can readily be refilled and emptied.

Other objects will appear from the following description and appended claim as well as from the accompanying drawing, in which—

As illustrated, the container 3 is preferably made of glass or similar transparent material, making it easy to observe or ascertain when a container is full, or empty to necessitate a refilling.

The cover 4 is designed so that it may keep the container firmly or even hermetically closed or sealed when the device is not used, having the edges 5 shaped to engage over the top edge of the container.

Brackets 6 extend from the underside of the cover downwardly into the container whereby a tray 7 is supported upon which desired objects, such as food, or, more particularly, crackers can be held ready for use by a customer of a restaurant in a sanitary condition, dotted lines 8 indicating such objects resting on the tray 7.

Figure 1:
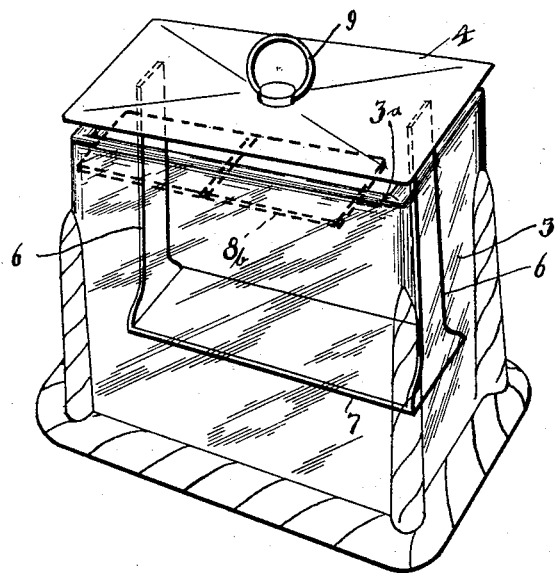
Fig. 1 is a perspective view of a container and a removable holder of a simple form to be used and operate according to this invention.
Figure 2:
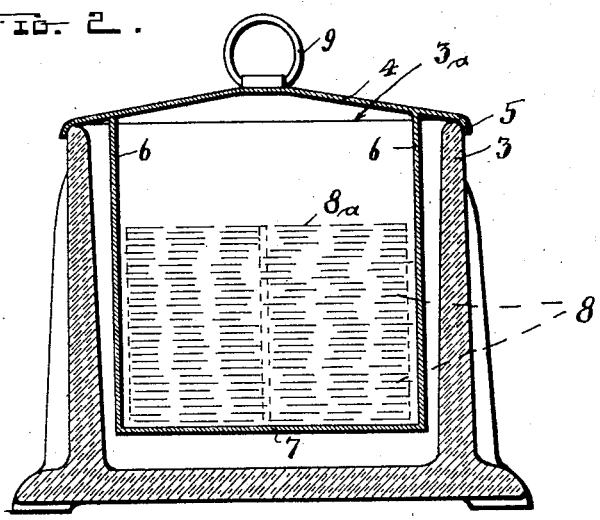
Fig. 2 is a vertical midsectional view of the device illustrated in Fig. 1.

It will easily be understood that the tray 7 can be lifted sufficiently to bring the topmost object, indicated at $8_a$ in Fig. 2, to come to a level that this object may be grasped and taken from the container over the top edge $3_a$ in a sidewise direction as illustrated and indicated at $8_b$ in Fig. 1.

The cover 4 is provided with a handle member 9 by which the attached tray 7 and therewith any stored objects can be handled as suggested above.

Since the whole tray can be lifted from the container by means of the cover 4 and the brackets 6, the tray can be refilled readily, and, by providing a transparent container, the device can be maintained supplied with goods at all times since it can be easily observed just when a refilling becomes necessary.

Outer ornamentations make the device attractive to make it a desirable permanent fixture for any table.

Having thus described my invention, I claim:

In a device of the class described, a container with an open top side, a cover adapted to close said top side, brackets extending downwardly into the container from the underside of the cover and being of a flat form adapted to evenly stack and guide biscuits and the like between the flat upright brackets, a tray near the bottom of the container supported by the brackets, and a handle member on the cover.

In testimony that I claim the foregoing as my invention I have signed my name.

GOTTFRIED NICKEL.